United States Patent [19]

Spors

[11] Patent Number: 5,353,478
[45] Date of Patent: Oct. 11, 1994

[54] HOSE CLAMP

[75] Inventor: Ralf Spors, Bruchkobel, Fed. Rep. of Germany

[73] Assignee: Rasmussen GmbH, Maintal, Fed. Rep. of Germany

[21] Appl. No.: 145,872

[22] Filed: Nov. 2, 1993

[30] Foreign Application Priority Data

Nov. 5, 1992 [DE] Fed. Rep. of Germany ....... 4237330

[51] Int. Cl.$^5$ .......................................... B65D 63/00
[52] U.S. Cl. ................. 24/20 R; 24/20 CW; 24/20 EE
[58] Field of Search ............... 24/20 R, 20 CW, 20 S, 24/20 W, 23 EE, 20 EE

[56] References Cited

U.S. PATENT DOCUMENTS

| | | | |
|---|---|---|---|
| 1,687,854 | 10/1928 | Anderson | 24/20 EE |
| 4,517,708 | 5/1985 | Calmettes et al. | 24/20 CW |
| 4,712,278 | 12/1987 | Oetiker | 24/20 W |
| 4,742,600 | 5/1988 | Calmettes et al. | 24/20 R |
| 4,919,682 | 4/1990 | Bellazzi | 24/20 R |
| 4,987,651 | 1/1991 | Oetiker | 24/20 R |

*Primary Examiner*—Victor N. Sakran
*Attorney, Agent, or Firm*—Darby & Darby

[57] ABSTRACT

A clamp, especially a hose-clamp, wherein a band with overlapping end portions has a radial outer end portion having a first closure element and a slot. The slot extends in a circumferential direction along the clamp. The radial inner end portion has a projection and a second closure element, which when closing the clamp comes into a locking mechanism engagement with the first closure-element. The projection can be inserted into the slot and can be locked in this position. In order to avoid the danger of locking the projection at its insertion into the slot, and to assure that the end portions retain their required relative position when applying tension to the clamp, the projection is a circumferentially extending bar and the slot has a pair of flaps on opposite edges of the slot and protruding into the slot. The bar has notches which are provided for the radial passing of the flaps and the bar is shorter than the slot of the clamp in a circumferential direction.

7 Claims, 2 Drawing Sheets

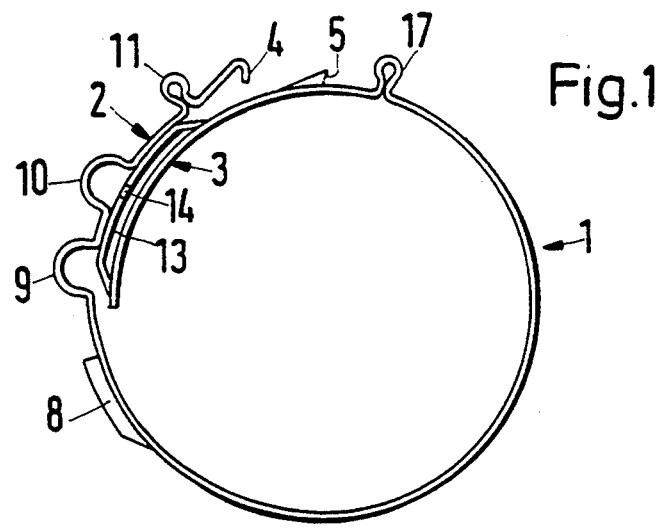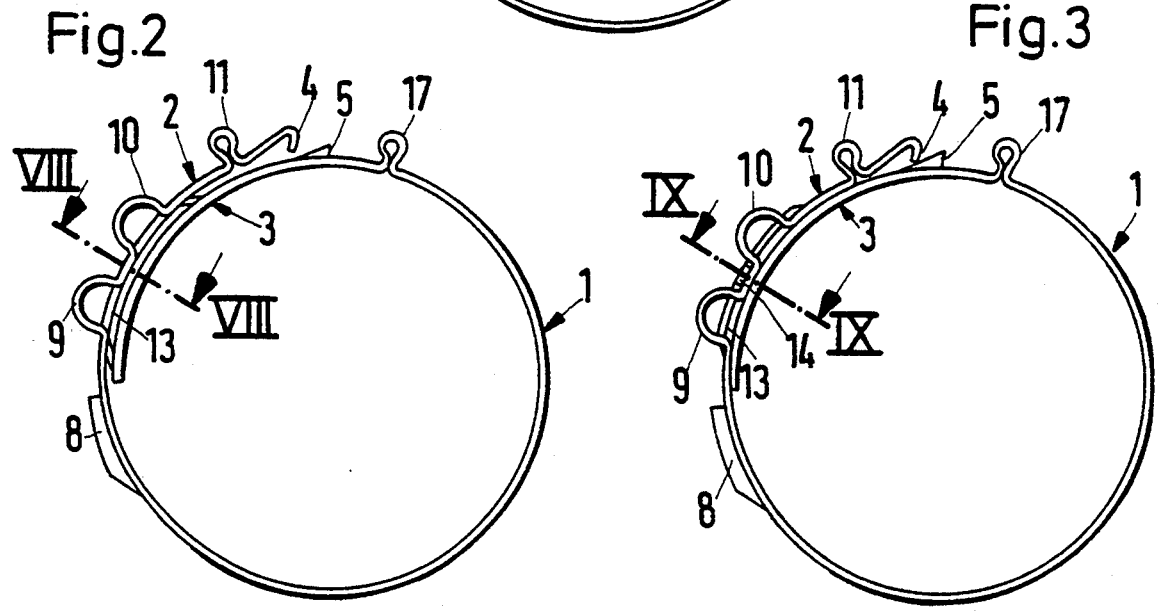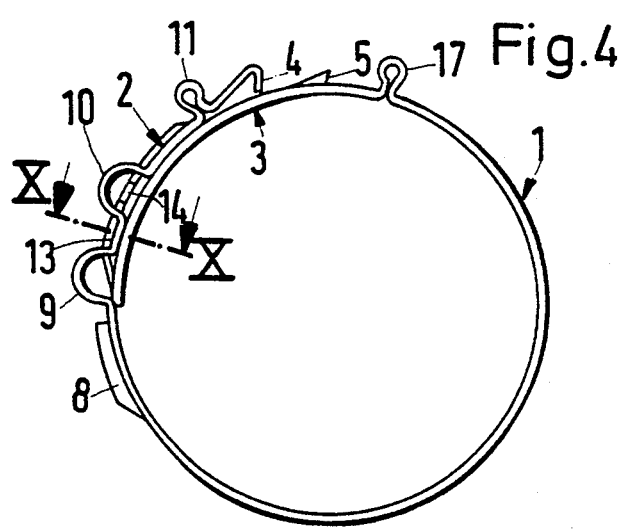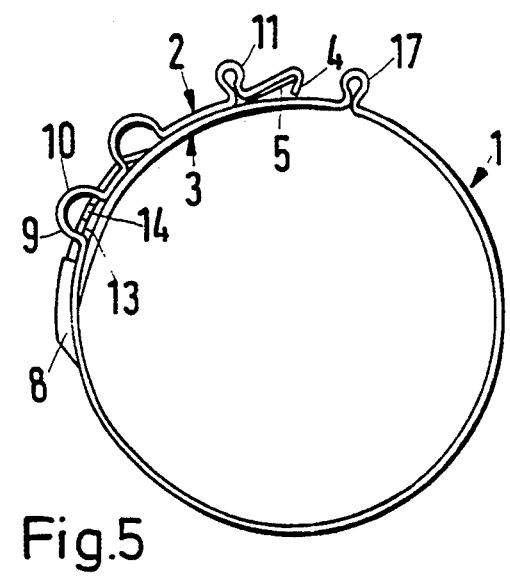

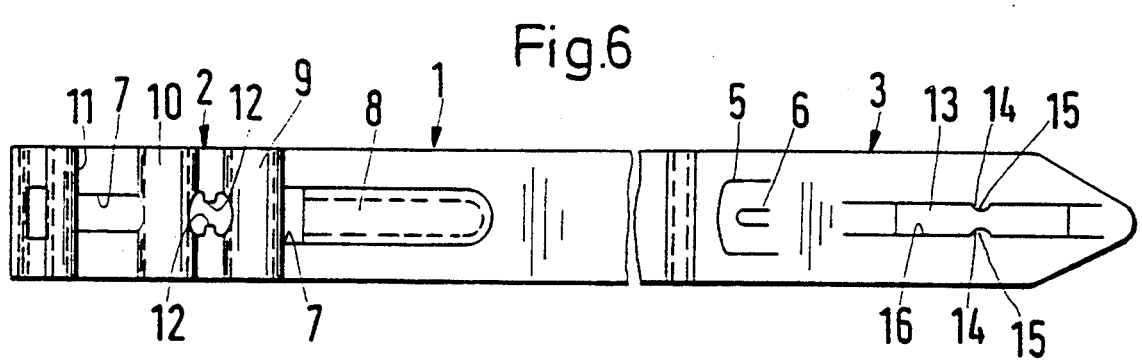
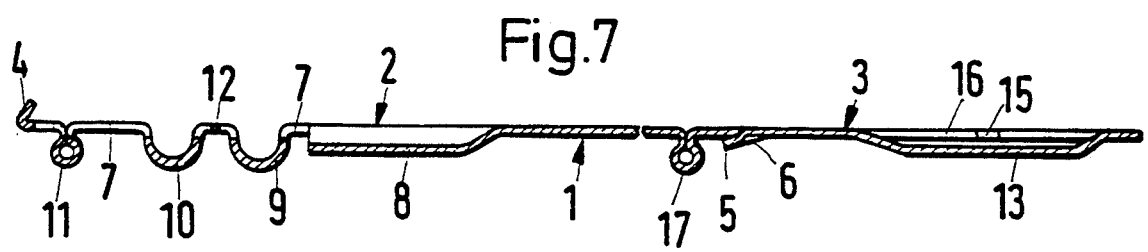
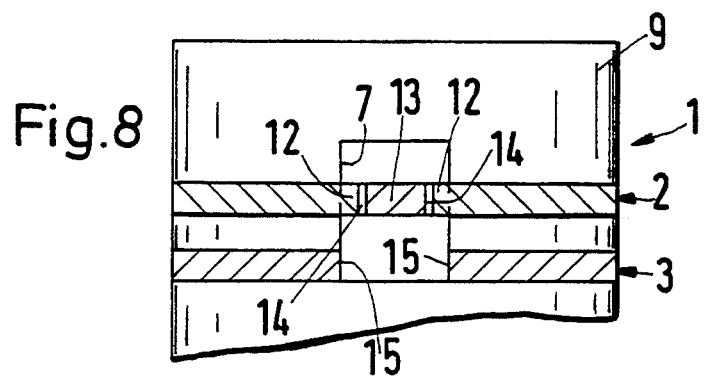
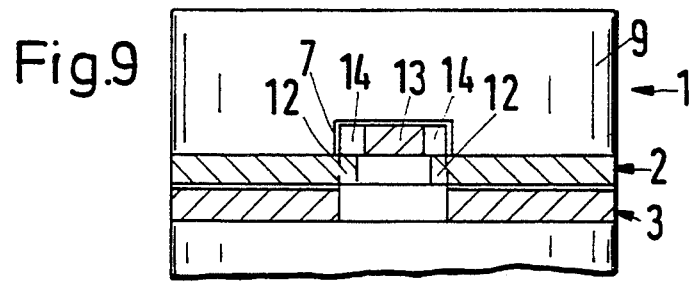
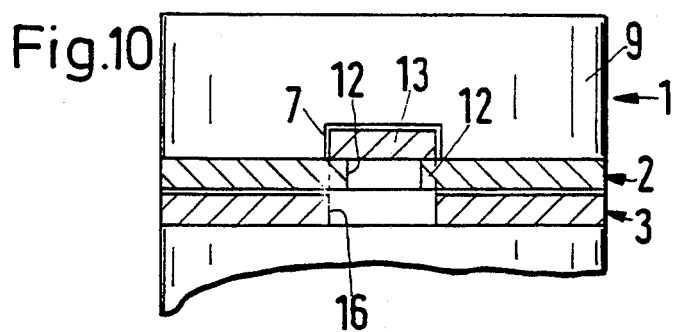

HOSE CLAMP

FIELD OF THE INVENTION

The present invention relates to a clamp. More specifically, the present invention relates to a hose clamp having a band with overlapping end portions which use a first closure element attached to one end portion and a second closure element attached to the other end portion.

BACKGROUND OF THE INVENTION

Examples of prior art types of band clamps include U.S. Pat. No. 4,742,600. A slot in one end portion has on its edges clearances or recesses in order to allow a T-shaped projection from the other end portion to pass through. The T-shaped projection allows the end portions to be pre-fastened, before the closure elements are engaged by the locking mechanism during tensioning of the clamp.

Notwithstanding the foregoing types of band clamps, there are still major problems involved. The projection is typically formed at the end of the radial inner end portion and bent radially to the outside. When inserting the projection into the slot there is always the danger that it may be bent into its original shape or even get bent further and prevent insertion by not having enough clearance in the longitudinal edges of the slot. Furthermore, the radially outer end portion could rotate at right angles to the circumferential direction of the band around the projection due to accidentally applied lateral forces. This will prevent the end portions of the band from assuming the required relative position to each other when applying tension to the band.

It is, therefore, an object of the present invention to produce a clamp that avoids the danger of bending the projection at the time of insertion into the slot and insures retention of the relative position of the end portions while tension is being applied to the band.

SUMMARY OF THE INVENTION

In accordance with a preferred embodiment demonstrating further objects, features and advantages of the invention, a hose clamp has end portions overlapping each other. The outer end portion includes a circumferentially extending slot having on its edges flaps or clips protruding into the slot. The inner end portion has a projection formed as a bar extending circumferentially at a distance from the inner end portion corresponding to at least the band thickness. There are cutouts or notches at a distance from the ends of the bar in the circumferential edges of the bar and the bar is designed to be shorter than the slot in the circumferential direction of the clamp to allow for the radial passage of the slaps through the notches and the insertion of the bar into the slot.

The bar is supported at both of its ends by the band, similar to a bridge, so that it is practically impossible to bend the bar in a circumferential direction. This design makes it easier to slide the end portions of the band over each other when inserting the bar into the slot while the flaps are forced to pass through and are guided by the notches or recesses in the longitudinal edges of the bar. Thereafter, when releasing the end portions and before the closure elements are brought into engagement with each other, the flaps are pushed back by the spring-pressure and guided along the radial inner side of the bar up to the bar end not facing the closure elements, where the flaps are abutting a foot of the bar. If in this position lateral forces react on the outer end portion of the band, one of the longitudinal edges of the slot will contact one of the longitudinal edges of the bar, so that the outer end portion of the band cannot be moved or turned laterally relative to the inner end portion. When the clamp will be tensioned until the closure elements are in locking engagement with each other, the flaps move to that end of the bar, which is facing the closure elements. In this position they will continue to lie on the radial inner side of the bar and within a shorter distance from the closure-elements and contribute to the radial locking action of the locking mechanism of the closure elements.

It is preferred that the outer end portion provides a crease or bead for receiving at least a portion of the length of the bar inserted into the slot when closing the clamp. This crease protrudes radially outwardly and is located along the circumferential direction of the clamp and is open toward the slot. With this design the bar is not only guided longitudinally by the slot but also by the crease.

The slot can also be bridged by radially and outwardly protruding corrugations of the band. These corrugations do not only provide for the elasticity of the band in the circumferential direction of the clamp, but also prevent a sideways lateral widening of the slot if a high torque due to undesirable axial forces is exerted on the outer end portion of the band.

Further, the band may be made from metal, and the bar may be formed by the provision of through-cuts or incisions in the band and the pressing out of the band material between the through-cuts. In this way the bar and the band are created in a one piece construction providing a high stiffness to the bar and good strength to the connection between the bar and the band.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is a side-view of a clamp shown prior to pre-locking of the end-sections of the clamp-band according to the present invention;

FIG. 2 is a side-view of the clamp shown in FIG. 1 in a first phase of the pre-locking of the end portions of the band;

FIG. 3 is a side-view of the clamp shown in FIG. 1 in a second phase of the pre-locking of the end portions of the band;

FIG. 4 is a side-view of the clamp shown in FIG. 1 in a third phase of the pre-locking of the end portions of the band;

FIG. 5 is a side-view of the clamp shown in FIG. 1 in a stage of the pre-locking of the end portions of the band;

FIG. 6 is a top-view of the clamp-band prior to transforming the band into a circular-like shape by overlapping its end portions into the shape shown in FIGS. 1–5;

FIG. 7 is a longitudinal sectional view taken through the band of FIG. 6;

FIG. 8 is a cross-sectional view taken along line VIII—VIII of FIG. 2 and looking in the direction of the arrows;

FIG. 9 is a cross-sectional view taken along line IX—IX of FIG. 3 and looking in the direction of the arrows; and FIG. 10 is a cross-sectional view taken along line X—X of FIG. 4 and looking in the direction of the arrows.

DETAILED DESCRIPTION OF THE PRESENTLY PREFERRED EXEMPLARY EMBODIMENT

Referring to FIG. 1, the clamp is a hose clamp for fastening a hose on a pipe or pipe-socket. The clamp includes a metal band 1, which according to FIG. 1 is bent to a circular shape with its end portions 2 and 3 overlapping. The radially outer end portion 2 has at its end a first closure element 4 in the shape of a hook which is bent inward and the end portion 3 has a second closure element 5, shaped like a hook. The latter hook shape is achieved by creating a through-cut or incision transversely to the longitudinal direction of the band and by extruding or pressing out the band material on one side of the through-cut in the shape of the scale of a fish. The pressed out band material also has a stiffening crease 6 or bead (see FIGS. 6 and 7) which is in the circumferential direction of the clamp. The closure elements 4 and 5 provide an undercut so that the band can be brought to a locking mechanism engagement position, thus, preventing an easy radial separation movement.

End portion 2 includes a slot 7 in the circumferential direction (see FIGS. 6–10) and a radially outwardly protruding crease 8 or bead which extends in a circumferential direction along the clamp. The crease 8 is open towards the slot 7. In addition, the slot 7 is bridged over the radially outwardly protruding corrugations 9, 10 and 11. These corrugations 9, 10 and 11, especially corrugations 9 and 10, provide the band 1 a certain elasticity in the circumferential direction and at the same time prevent a lateral widening of slot 7. The corrugation 11 also serves to help apply a tensioning tool, such as a pliers, to bring closure elements 4 and 5 into a locking mechanism engagement.

The slot 7, as shown in FIGS. 6–10, has at its edges flaps or clips 12 which protrude into the slot 7 and face each other. The flaps 12 protrude transversely with respect to the slot 7 and are located opposite one another approximately in the center of the length of the slot 7 between corrugations 9 and 10.

The radially inner end portion 3 has a radially and outwardly protruding projection which can enter the slot 7 and can be locked there. The outer projection has the shape of a bar 13 and extends in a circumferential direction of the clamp and in a distance from the inner end portion 3, which distance corresponds at least to the thickness of the band 1.

In the edges of the bar 13, which extend in the longitudinal direction as well as in the circumferential direction of the clamp, there are provided notches 14, cut-outs or recesses at a distance from the ends of bar 13. The notches 14 are facing each other and allow for the radial insertion and passage of the flaps 12. The bar 13 is shorter in the circumferential direction of the clamp than the slot 7, so that the bar 13 after entering slot 7 is movable in a circumferential direction of the clamp. With this movement at least a portion of the length of the bar 13 can be received by the crease 8, as is shown in FIG. 5. The bar 13 is formed by the creation of through-cuts or incisions in band 1 and the pressing out of the band material between the through-cuts. The through-cuts simultaneously form the notches 14 at the longitudinal edges of bar 13 and flaps 15 at the longitudinal edges of a slot 16 remaining in band 1 after having pressed out the bar material from band 1, the flaps 15 conforming to the notches 14 (FIGS. 7 and 10). The end portion 3 also has a radially outwardly protruding corrugation 17, formed from the band material in a somewhat larger spacing from the end of the end portion 3 as compared to that of the closure element 5. This corrugation 17, as well as the corrugation 11, are squeezed together at their radially inner ends and serve as support for applying a tensioning tool, such as a pliers, when exerting tension to the clamp.

In order to pre-lock the clamp, the end portion 2 will first be moved above the end portion 3, as can be seen in FIG. 1. The flaps 12 (not visible in FIGS. 1–5) are supported at the radially outer side of the bar 13 and slide along on it until they assume the first phase of the pre-locking position shown in FIGS. 2 and 8, in which the flaps 12 engage in the notches 14 of the bar 13. From this position the end portion 2 will be pushed further radially to the inside until it is in the second phase of the pre-locking position shown in FIGS. 3 and 9 and the end portion 2 is resting on the inner end portion 3. From this position the end portions 2 and 3, while retaining their radial positions, can be moved relative to each other, due to the inherent elasticity of band 1 or by exerting a force in the circumferential direction to the end portions 2 and 3, up to the positions shown in FIGS. 4 and 10. During this movement the flaps 12 slide along the radially inner side of the bar 13, as is shown in FIG. 10. In this position the end portions 2 and 3 are pre-locked in the radial direction relative to each other and, while the end portions 2 and 3 move further apart in a circumferential direction, the flaps 12 finally will touch the inclined end portion of the bar 13, which end portion faces the crease 8. In this final position the clamp can be handled much easier because the end portions 2 and 3 are fixed relative to each other and practically cannot move in the axial direction of the clamp, due to the fact that bar 13 is inserted in slot 7 and is longitudinally guided in it.

In the position shown in FIGS. 4 and 10 a pliers, or similar tool, will be applied at the corrugations 11 and 17, when the clamp is to be tensioned and the closure element 4 will be pulled over the closure element 5, so that the closure elements 4 and 5 finally assume the position shown in FIG. 5, wherein they are in a locking mechanism engagement. With this transfer motion of the closure elements 4 and 5, and end portions 2 and 3, the bar 13 will continue to be guided longitudinally in the slot 7 and finally inserted in the crease 8 as is shown in FIG. 5. The crease 8 supplements the guiding of the bar 13. In the closed position of the clamp, as shown in FIG. 5, the flaps 12 rest on the inside of the bar 13, however closer to that end of the bar 13, which is closer to the closure element 5, so that the flaps 12 also assure that the end portions 2 and 3 cannot move apart radially while in this position.

Instead of fastening a hose, the illustrated clamp can also be used for interconnecting rod shaped or other tubular parts, for example, cables. Additionally, the clamp could be made from materials other than metal, such as a synthetic resin, e.g. polyamide.

From the foregoing description, it will be appreciated that the present invention makes available a compact, cost-efficient hose-type clamp. The clamp is designed to allow for simple operation that avoids the danger of bending of the flaps at the time of insertion into the slot and insures retention of the relative position of the end portions while the band is in tension.

Having described the presently preferred exemplary embodiment of a new and improved hose-type clamp in accordance with the present invention, it is believed that other modifications, variations and changes will be suggested to those skilled in the art in view of the teachings set forth herein. It is, therefore, to be understood that all such variations, modifications and changes are believed to fall within the scope of the present invention as defined by the appended claims.

What is claimed is:

1. A clamp comprising:

a band having a radial outer end portion overlapping a radial inner end portion;

the outer end portion having a first closure element and a slot, the slot extending in a circumferential direction along the clamp and having a predetermined length, the slot having a pair of clips disposed on opposite edges of the slot and protruding into the slot;

the inner end portion having a second closure element and a bar, the bar protruding in a radial outward direction and extending in a circumferential direction along the clamp and having a predetermined length that is shorter than the length of the slot, the bar having a first end adjacent to said second closure element and a second end remote from said second closure element, the bar having a pair of openings disposed on opposite edges of the bar and protruding into the bar;

the outer end portion being radially movable with respect to the inner end portion to a pre-locked position when the pair of clips are radially aligned with the pair of openings to allow the bar to be inserted into the slot, the outer end portion being circumferentially movable with respect to the inner end portion to a locked position where the first closure element is in contact with the second closure element and said pair of clips are in contact with said bar adjacent to said first end of said bar.

2. The clamp according to claim 1, wherein the outer end portion includes a crease protruding in the radial outward direction.

3. The clamp according to claim 2, wherein at least a portion of the bar is adapted to be inserted into the crease.

4. The clamp according to claim 3, wherein the outer end portion includes a pair of corrugations protruding in the radially outward direction and bridging the slot.

5. The clamp according to claim 4, wherein one of the corrugations being disposed on a side of the pair of flaps adjacent to the first closure element and the other of the corrugations being disposed on a side of the pair of flaps remote from the first closure element.

6. The clamp according to claim 5, wherein the band is made of a metallic material.

7. The clamp according to claim 6, wherein the band is made of a one piece integral construction.

* * * * *